United States Patent [19]

Bartley

[11] 3,993,203

[45] Nov. 23, 1976

[54] METHOD AND APPARATUS FOR UNLOADING A RAILROAD CAR CONTAINING BULK CARGO

[75] Inventor: Thomas S. Bartley, Mobile, Ala.

[73] Assignee: International Paper Company, New York, N.Y.

[22] Filed: Nov. 7, 1975

[21] Appl. No.: 629,993

[52] U.S. Cl. .............................. 214/45; 214/52 C; 214/152; 214/301; 214/314
[51] Int. Cl.² ........................................ B65G 67/34
[58] Field of Search ................. 214/52 C, 55, 52 R, 214/52 B, 45, 301, 312, 314, 152

[56] References Cited
UNITED STATES PATENTS

| | | | |
|---|---|---|---|
| 758,191 | 4/1904 | Robertson | 214/314 X |
| 1,639,487 | 8/1927 | Collis | 214/301 |

Primary Examiner—Robert J. Spar
Assistant Examiner—George F. Abraham
Attorney, Agent, or Firm—Finnegan, Henderson, Farabow & Garrett

[57] ABSTRACT

A method and apparatus for unloading bulk cargo from a railroad car that is enclosed within a receiver box which is, in turn, movably mounted within a rotating frame. The car is rotated approximately 180° while selectively attached to the frame to place the cargo within the receiver box. The receiver box is thereafter moved from its car enclosing position and a cover placed thereon. Rotation of the frame, car and covered receiver box approximately 180° places the apparatus in a position to discharge the cargo from the receiver box and the car from the frame.

14 Claims, 9 Drawing Figures

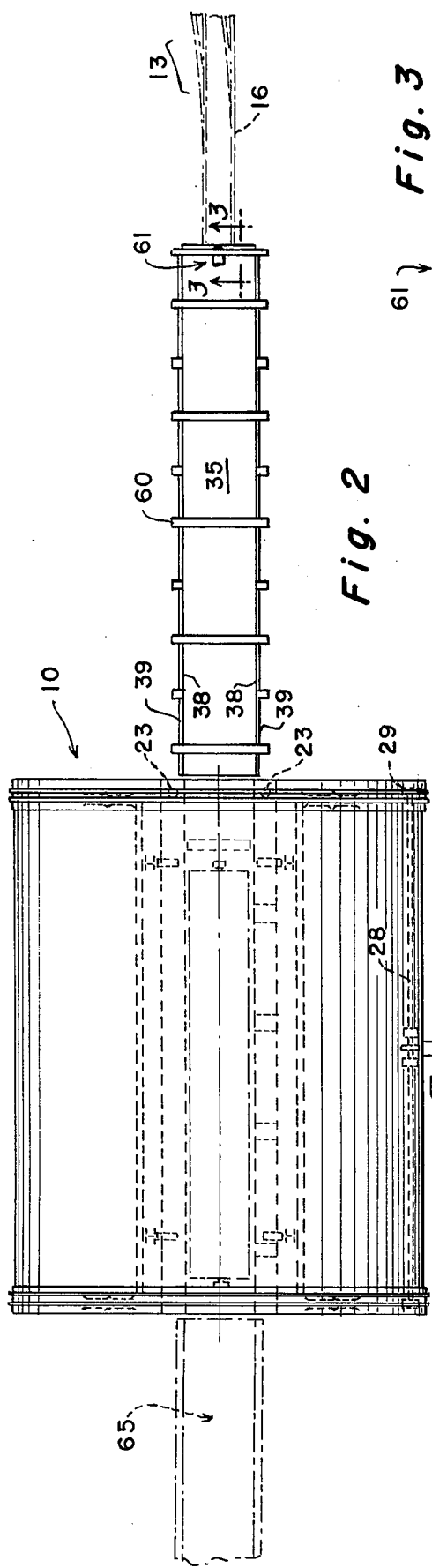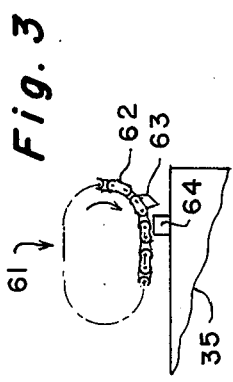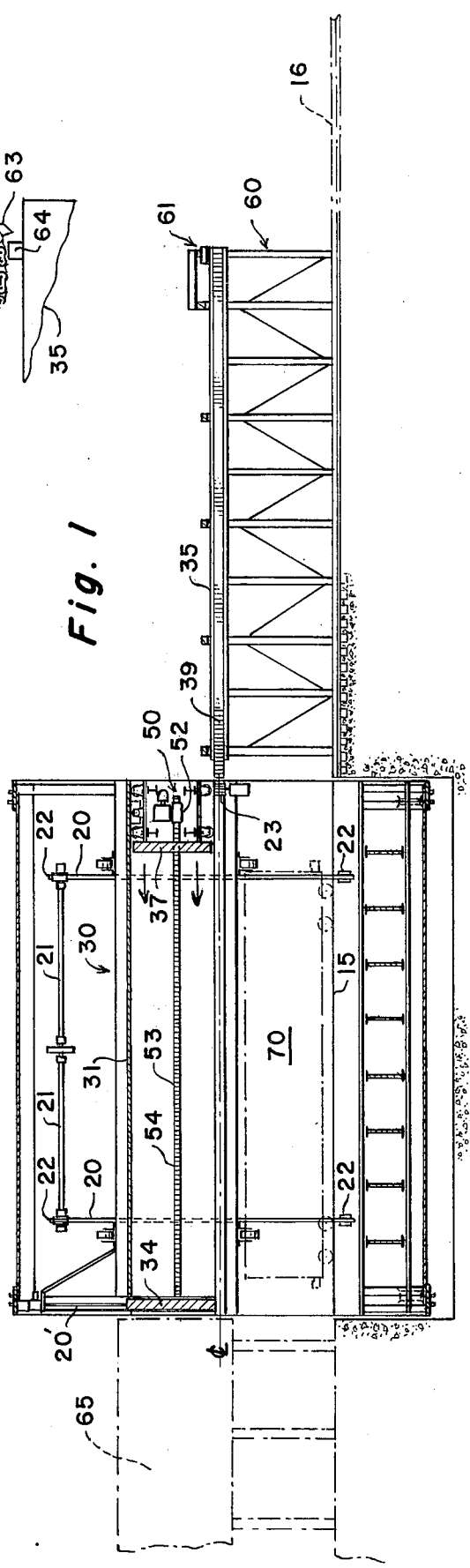

METHOD AND APPARATUS FOR UNLOADING A RAILROAD CAR CONTAINING BULK CARGO

FIELD OF THE INVENTION

The present invention relates to rotary car dumping means in which bulk cargo is discharged from railroad cars by the tipping or inversion of the car.

BACKGROUND OF THE INVENTION

Large amounts of bulk materials such as coal, ore, scrap metal and wood are transported in open railroad cars. The design of the cars varies widely depending upon the shape and the weight of the bulk cargo. Some of the cars include hoppers on the bottom of the car for unloading the cargo. These unloading means require the cargo to be free flowing. Some materials which are free flowing and normally capable of being unloaded through hoppers may be difficult to unload if frozen or wet. In addition, the cargo may settle during transit to become at least partially coherent. Since most bulk cargo carrying cars are open, the addition of water or ice to the cargo may prevent its efficient unloading characteristics of the cargo, the hoppers themselves are subject to malfunction and cause added expense in manufacture of the car and its maintenance. The unloading of such cars from the open top alleviates many of the problems associated with bulk cargo cars employing bottom unloading hoppers.

There are also bulk cargo carrying cars that have no provision for unloading through the bottom of the cars. The cargo can be unloaded from these cars in a variety of ways. Material conveyors can be placed within the cars or if the cargo is magnetic, it can be removed with electromagnets. Another means of unloading bulk cargoes from cars having open tops is to at least partially invert the car and pour the cargo from the car into some receiving means.

Prior art devices for such purposes either discharge the cargo into a pit below the apparatus or the apparatus itself is raised above ground level as, for example, on a trestle. The space beneath the apparatus receives the cargo dumped from the car and any material handling equipment used to transport the unloaded cargo operates within that space.

The dumping of bulk cargo in such a manner creates several major problems. One problem is the expense of elevating the track and providing powered means to place the cars within the unloading device. Another is the expense of excavating and maintaining a pit beneath the unloading device.

Still another problem with conventional dumping techniques that use elevated track or a pit results from the free fall distance of the cargo. When the cargo free falls a distance that corresponds to at least the height of the car, large amounts of dust can be generated. Furthermore, if the bulk cargo is stacked, as, for example, pulpwood logs, the fall may entangle the logs and create further material handling problems.

The present invention provides a means of unloading bulk cargoes that does not rely on the cargo's being free flowing since the cargo is removed through the open top of the car. The cargo does not fall a large distance and, therefore, the creation of dust is minimized. Furthermore, if the cargo is ordered, for example, stacked pulpwood logs, the unloading will not disorder the load in an amount that would significantly affect further cargo handling. In addition, the cargo once removed from the railroad car is completely enclosed and the unloading of the receiver box into which the cargo is initially placed can be readily controlled and interrupted.

The invention is adapted for use with a large variety of railroad cars and can be used to unload a variety of bulk materials.

Additional advantages of the invention will be set forth, in part, in the description which follows, and in part, will be obvious from the description, or may be learned by practice of the invention. The advantages of the invention may be realized and attained by means of the instrumentalities and combinations particularly pointed out in the appended claims.

SUMMARY OF THE INVENTION

In accordance with the purpose of the invention as embodied and broadly described herein, the railroad car unloader of this invention comprises a rotatably mounted frame having railroad track mounted thereon for supporting a railroad car containing bulk cargo. Drive means rotate the frame from a car-supporting position at least about 180° about the longitudinal axis of the frame to a discharge position and the cargo is thereby discharged by gravity from the railroad car supported on the track. Clamping means are mounted on the frame for holding the railroad car on the track during the rotation of the frame and the railroad car, a receiver box having interior dimensions greater than that of the exterior dimensions of the railroad car movably mounted on the frame. The receiver box has means for covering the top of the receiver box containing the cargo discharged from the railroad car when the frame is rotated from its discharge position to its car-supporting position. Positioning means provide for the cyclic moving of the receiver box to permit the entry of a railroad car into the frame and to enclose the top and sides of the railroad car within the receiver box and to lower the receiver box away from the railroad car to permit the placement of the receiver box cover on the receiver box before rotation of the frame back to its car-carrying position.

A railroad car containing bulk cargo is unloaded by affixing the car to a portion of railroad track on a rotatable frame. A receiver box, also affixed to the rotatable frame, is lowered over the railroad car. The rotatable frame, the railroad car and the receiver box are then rotated about 180° about their longitudinal axis placing the cargo within the railroad car within the receiver box. The receiver box is lowered, the receiver box cover is placed on the receiver box and the rotatable frame, receiver box and the railroad car are again rotated 180°. The cargo within the receiver box is then discharged.

Preferably, the frame includes a plurality of circular circumferential rails supporting the frame on trunnion bearings allowing the frame to rotate about its longitudinal axis.

It is also preferred that the receiver box include a bottom, a load bearing sidewall capable of supporting the rail car and its cargo during rotation of the frame, a second sidewall, a first endwall and an opposed removable endwall.

The preferred receiver box also includes a discharge means for discharging the cargo from the receiver box when the removable endwall is removed.

It is also preferred that the discharge means comprise a piston mounted on the receiver box adjacent the first endwall. The piston moves along the longitudinal axis of the receiver box to discharge the cargo out of the end of the receiver box when the removable endwall has been removed.

BRIEF DESCRIPTION OF THE DRAWINGS

The invention consists in the novel parts, constructions, arrangements, combinations and improvements shown and described. The accompanying drawings which are incorporated in and constitute a part of this specification, illustrate one embodiment of the invention, and together with the description, serve to explain the principles of the invention.

Of the Drawings:

FIG. 1 is a longitudinal cross-sectional side view of one embodiment of the apparatus.

FIG. 2 is a longitudinal top view of one embodiment of the apparatus.

FIG. 3 is a detailed view of one means of moving the receiver box cover into initial engagement with the receiver box.

DETAILED DESCRIPTION OF THE INVENTION

Figure 4:
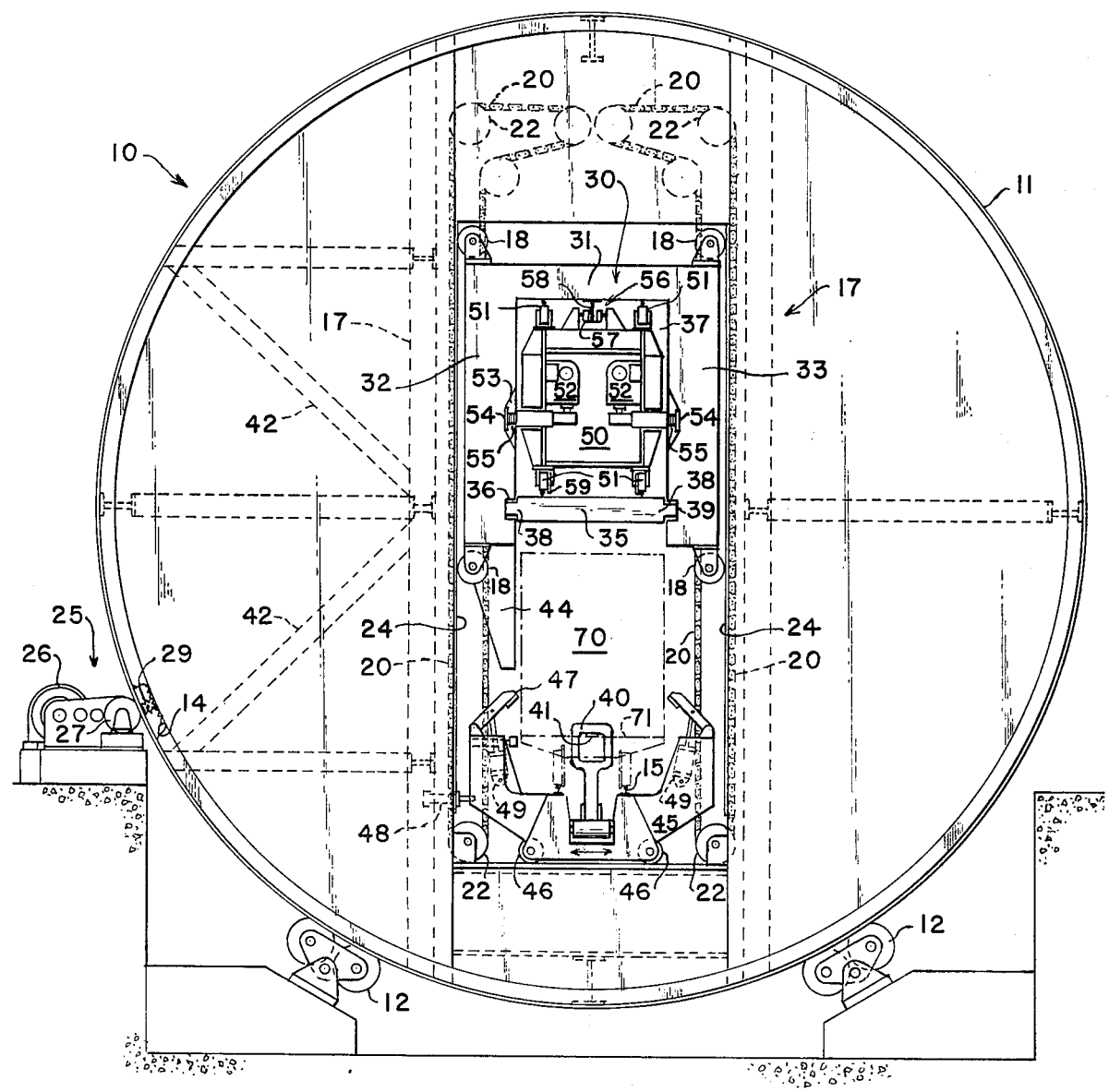
FIG. 4 is an end view of one embodiment of the apparatus.

Reference will now be made in detail to the present preferred embodiment of the invention, an example of which is illustrated in FIGS. 1–4 of the accompanying drawings. The unloading device of this embodiment comprises a rotating frame 10 and a receiver box 30 for unloading a bulk cargo carrying railroad car 70.

In accordance with the invention, the frame is rotatably mounted with railroad track mounted thereon for supporting a railroad car containing bulk cargo. As here embodied and best seen in FIG. 4, the rotating frame 10 is cylindrical in shape having a plurality of circular circumferential rails 11 that support frame 10 on a plurality of trunnion bearings 12. The trunnion bearings 12 allow the frame 10 to rotate about its longitudinal axis. The size of frame 10 is dependent on the size of the railroad cars to be placed on frame 10. As here embodied, frame 10 will preferably accommodate railroad cars of 100 net tons capacity of bulk cargo having a maximum gross weight of 265,000 pounds. The physical dimensions of railroad cars operable with the invention as here embodied would have a height of up to 17 feet, 6 inches, a width of up to 11 feet and a maximum length over the coupling of 80 feet. Without limiting the invention to specific railroad car configurations, the disclosed embodiment is particularly suited for the unloading of hopper cars and pulpwood flat cars.

As depicted in FIGS. 1 and 4, it is preferred that the track 15 within frame 10 be approximately at ground level. This configuration alleviates the necessity of providing large amounts of elevated track that would be required if the track 15 was above ground level. In the embodiment depicted, the preferred location of the level of track 15 requires an excavation to accommodate a portion of cylindrical frame 10 and the supporting trunnion bearings 12.

Preferably, frame 10 will be closed at one end with the railroad cars to be unloaded entering an exiting at the same end of the frame. The invention is also applicable to embodiments having a frame that is selectively open at each end allowing passage of a railroad car completely therethrough. Although such an embodiment would require a more complex frame structure, it would simplify the trackwork associated with the unloading device. As shown in FIG. 2, railroad track 16 with an illustrative switch 13 to route loaded and unloaded cars is provided at one end of the frame 10. In FIG. 2, the track is hidden immediately adjacent the frame 10 by a receiver box cover 35 which is supported by the receiver box cover support structure 60. Preferably, track 15 within frame 10 is aligned with the track 16 leading to the apparatus when the frame 10 is in the car receiving position depicted in FIG. 4. The configuration of frame 10 and the associated components in the receiving position will be more fully disclosed in a subsequent portion of the disclosure when the operation of the apparatus is described in detail.

As depicted in FIG. 4, frame 10 is positioned with the rails 15 at approximately ground level. Other components that will be hereinafter fully described are shown in fully retracted positions (with the exception of the pivotally mounted sill clamp 40 which can be retracted). In such a configuration, a railroad car can be placed within the frame 10 on the rails 15 or removed therefrom. The configuration of the apparatus as depicted in FIG. 4 where the railroad car may be received or removed from the frame 10 is termed the car supporting position. Rotation of frame 10 about its longitudinal axis is about 180° (with the accompanying appropriate placement of components within the frame) places the apparatus in the discharge position. At that position, the railroad car within frame 10 is inverted and its cargo is thereby discharged by gravity.

In accordance with the invention, drive means are provided for rotating the frame from the car supporting position at least about 180° about the longitudinal axis of the frame to the discharge position. The rotation of the car enables discharge of the bulk cargo from the car by gravity. As here embodied and as illustrated in FIG. 4, the drive means generally 25 are comprised of a motor 26 engaged through a speed reducer 27 to a longitudinal shaft (FIG. 2) in engagement through a pinion gear 29 with circumferential circular rack gears 14 on the extremities of the frame 10. The motor 26 or a plurality of motors used to power the driving means preferably has about 500 horsepower. It is also preferred that the drive means include a braking means (not shown) allowing the rotation of the frame 10 to be stopped at any point.

In accordance with the invention, clamping means are mounted on the frame for holding the railroad car on the track during the rotation of the frame and the railroad car. As here embodied and best seen in FIG. 4, a sill clamp 40 engages the sill 71 of a railroad car 70 within the frame 10. The sill clamp 40 is shown, defining an opening 41 through which the coupler (not shown) of the railroad car can pass thereby allowing the sill clamp to engage the sill 71 immediately adjacent the coupler. The clamping means may alternatively engage the couplers on the railroad car, or the sidewalls of the car.

Due to the variation in dimensions and configurations of railroad cars containing bulk cargoes, frame 10 preferably includes means for accommodating as many different types of railroad cars as possible. As here embodied, frame 10 includes a pair of platens 45. One platen 45 is illustrated in FIG. 4 on which sill clamp 40 is mounted. Platen 45 is mounted on rollers 46 and is movable in a direction transverse to the longitudinal axis of the track 15 and the frame 10 as indicated by the arrows thereon. Hydraulic cylinders 48 mounted on frame 10 are provided for transversely moving platen 45. Frame 10 also includes a similar platen at the end of the railroad car 70 opposite the end depicted in FIG. 4.

The transverse movement of the railroad car provided by platens 45 within the frame 10 allows the sides of cargo on a flat car or the sides of a hopper car to be placed in an abutting relation to the side of the receiver box 30 that will bear the load of the car and/or the cargo upon the rotation of the frame 10.

Further accommodations for various railroad cars are depicted in FIG. 4 including auxiliary side clamps 47 that can be used in the unloading of sideless flat cars or in clamping cars with sides. The auxiliary side clamps are pivotally mounted at one end of the platen 45. They are moved into engagement with the sills of the flat car by hydraulic cylinders 49.

In accordance with the invention, a receiver box for receiving bulk cargo from the railroad car is movably mounted on the frame. The receiver box has interior dimensions greater than the exterior dimension of a railroad car to be unloaded. It is the function of the receiver box to surround the railroad car and receive the bulk cargo when the car is inverted.

As here embodied and best seen in FIG. 4, the receiver box 30 is generally rectangular and comprises a receiver box bottom 31, a load bearing sidewall 32, a second sidewall 32, a second sidewall 33, and as illustrated in FIG. 1, a removable endwall 34. As here embodied, receiver box 30 also includes discharge means for discharging the cargo from the receiver box 30 when the removable endwall 34 is removed. The discharge means, as illustrated in FIG. 1, comprises a movable endwall 37 driven by piston 50. The load bearing sidewall 32 is capable of supporting the railroad car and its cargo during rotation of the frame.

An additional support is preferably provided for cars having high sidewalls with the extensions of the load bearing sidewall 32 comprising sidewall supports 44 contacting the high sidewalls by the transverse movement of the car by the platen 45. The receiver box load bearing sidewall 32 supports the high sidewalls of the railroad car during inversion of the car while it is enclosed within the receiver box 30. It is the function of sidewall supports 44 to support the high sided cars when they are being rotated empty with the receiver box retracted from the position depicted in FIG. 8 to that depicted in FIG. 9.

Preferably, receiver box 30 is positioned within cylindrical frame 11 as depicted in FIG. 4 and is supported by a receiver box support frame 17. The receiver box support frame 17 comprises a frame surrounding the receiver box 30, laterally supporting the receiver box by means of rollers 18. The rollers 18 are shown attached to the receiver box 30 and would preferably be engaged on a track 24 affixed to the receiver box support frame 17. The receiver box support frame 17 is constructed to provide support to the load bearing sidewall 32 of the receiver box and as such may be more strongly constructed than the opposite side of the receiver support frame 17. As depicted in FIG. 4, the extra strength is provided by diagonal cross braces 42 supporting the load bearing sidewall 32 of the receiver box support frame 17.

A preferred discharge means for discharging the cargo from the receiver box is depicted in FIGS. 1 and 4. The preferred discharge means comprises a piston generally 50 mounted on the receiver box 30 at the end opposite the removable endwall 34. The piston 50 comprises the movable endwall 37 and the associated drive means hereinafter described. The movable endwall 37 substantially conforms to the interior dimensions of the receiver box 30. Movement of the piston 50 along the longitudinal axis (shown by arrows in FIG. 1) of the receiver box discharges the cargo out of the end of the receiver box from which the removable endwall 34 has been removed. The piston 50 of this embodiment is suspended within the receiver box by a plurality of rollers 51. Preferably, the rollers 51 or the surface on which the rollers engage the sidewalls would have means for preventing lateral motion of the piston. As shown in FIG. 4, the rollers 51 have flanges 57 thereon for that purpose.

The means of driving the piston 50 the length of the receiver box is preferably an opposed pair of pinion gears 55 engaged with a pair of rack gears 54 contained in depressions 53 on the inner sidewalls of the receiver box. The pinion gears 55 are driven by at least one motor mounted on the piston and connected to the pinion gears through reduction gears 52, as illustraded in FIG. 1.

A piston support means 56, depicted in FIG. 4, is provided on the bottom 31 of the receiver box. The piston is engaged on the piston support means so the piston will be retained in the indicated position when the receiver box cover 35 is removed. When the receiver box cover 35 is removed, it does not support the piston 50. As here embodied, the piston support means 56 generally comprises a pair of rollers 57 attached to the piston 50 and in engagement with a flanged beam 58 attached to the receiver box bottom 31. The flanged beam 58 need not extend the entire length of the receiver box since the piston needs to be supported only when the receiver box cover 25 is retracted. Retraction of the receiver box cover 35 normally takes place only when the piston 50 is in fully retracted position depicted in FIG. 1.

Preferably, the removable endwall 34 of the receiver box 30 will comprise an endwall 34 that can be suspended from the frame as depicted in FIG. 1 by power driven chains 20'. In such an embodiment, the removable endwall 34 must be restrained by the chains 20' in both vertical directions since the receiver box and, hence, the endwall are cyclically inverted. One means of providing support for the removable endwall is a powered chain configuration similar to that depicted in FIG. 4 for the receiver box. In such an arrangement, a chain is attached to the upper and lower edges of the removable endwall and a powered sprocket in engagement with the chain drives the removable endwall in either direction. A brake on the sprocket would restrain the endwall from movement in either vertical direction.

In accordance with the invention, a receiver box cover is provided to cover the receiver box when the frame is rotated from the discharge position to the car supporting position and to prevent discharge of material from the top of the receiver box during this rotational movement. As here embodied, and as depicted in FIGS. 1 and 4, the interior sidewalls of the receiver box each include a longitudinally extending slot 36 for receiving a receiver box cover 35.

Figure 5:
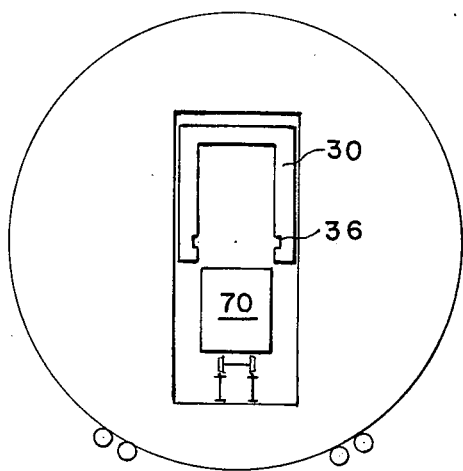
FIGS. 5 through 9 schematically illustrate a sequence of operations of an embodiment of the apparatus.
Figure 8:
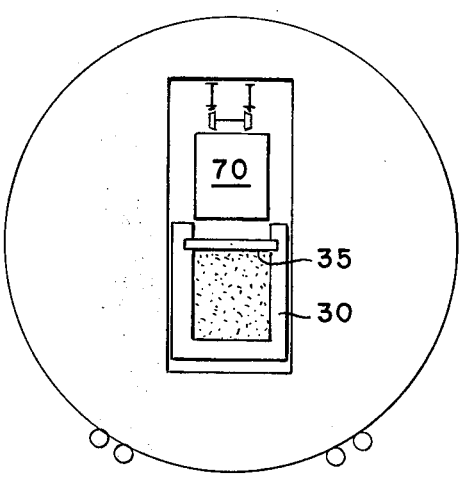

Preferably, the receiver box cover has on both exterior edges 38 a rack gear 39 extending substantially the length of the cover. The rack gears 39 are engaged with powered pinion gears 23 (shown in FIGS. 1 and 2) on frame 10 that move the cover into and out of engagement with the longitudinal slots in the receiver box sidewalls 32 and 33. A cover support structure 60 comprises an elongated structure on which the cover 35 is placed. In this embodiment, the centerline of the cover 35 when the cover support structure 60 is provided adjacent the frame including cover positioning means 61 generally for moving the cover into and out of engagement with the receiver box. As depicted in FIGS. 1 and 2, the cover support structure 60 is aligned with the longitudinal slots 36 in the receiver box. Preferably, the centerline of the slots 36 in the receiver box will align with the cover 35 when the cover is on the cover support structure 60 and the slots 36 have their centerline aligned in the horizontal plane of the axis of rotation of the rotating frame. When the cover support structure 60 and the slots 36 in the receiver box are so aligned, the cover 35 can be inserted into and extracted from the receiver box whether the receiver box is upright as depicted in FIG. 5 or inverted as depicted in FIG. 8. The consequence of this feature will become apparent when the method of operation is disclosed.

A preferred means of moving the cover into engagement with the receiver box is depicted in FIGS. 1, 2 and 3. As best seen in FIG. 3, an endless chain 62 is provided having on its outer surface pawl 63. The pawl 63 engages a lug 64 on the receiver box cover 35. In a preferred embodiment movement of the chain causes engagement of pawl 63 with lug 64 causing the cover 35 to move toward the frame 10. As previously disclosed, the frame includes means of driving the cover longitudinally into complete engagement with the slots 36 in the receiver box 30.

In accordance with the inventin, positioning means are provided on the frame for cyclically moving the receiver box. It is the function of the positioning means to move the receiver box to permit entry of a railroad car onto the frame, to subsequently enclose the top and sides of the railroad car with the receiver box, and to move the receiver box from the railroad car to permit placement of the receiver box cover on the receiver box before rotation of the frame back to the car supporting position.

As here embodied, the positioning means comprise driven chains that raise and lower the receiver box. FIG. 4 depicts a preferred embodiment where a pair of chains 20 are shown at the piston end of the receiver box. Preferably, there are a similar pair of chains 20 at the discharge end of the receiver box 30 engaged with a plurality of sprockets 22 (as shown in FIG. 1). The sprockets 22 are connected by longitudinal shafts 21 to the sprockets 22 driving the chains 20 depicted in FIG. 4. Each chain is attached at each end to the receiver box. The chain is passed over sprockets 22 that align the chain parallel to the direction of motion of the receiver box. In this manner, movement of the receiver box is controlled by a driving member that drives the chains 20. Preferably, the driving member includes a brake (not shown) to allow the receiver box to be stopped at any position between the allowed travel limits of the receiver box.

A preferred means of handling the bulk cargo after discharge from the receiver box is depicted in FIGS. 1 and 2. A conveying means 65 is positioned to receive cargo discharge from the end of the receiver box. Preferably, the conveying means would have a capacity for bulk cargo at least equal to the receiver box allowing the conveying means to receive the entire bulk cargo and thereafer to dispense the bulk cargo to further conveying means independent of the location or disposition of the railroad car.

METHOD OF OPERATION

The invention includes a method of unloading a railroad car containing bulk cargo. While the method is disclosed conjunction with the specific embodiment disclosed, the method is not limited thereto.

As disclosed, a preferred embodiment of the rotating frame 10 has one closed end and, therefore, the railroad car 70 is introduced and removed from the frame at the same end. FIG. 4 depicts the open end of the rotating frame 10. Similarly, FIGS. 5 through 9 schematically illustrate one end of rotating frame 10 with much of the detail removed for clarity, including the piston 50.

Figure 6:
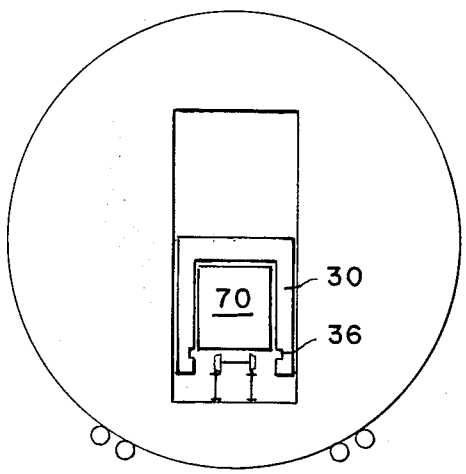

Initially, the frame 10 is prepared for the entrance of a railroad car 70. In the embodiment depicted in FIG. 4, the auxiliary side clamps 47 are retracted, the receiver box 30 is raised and the railroad track 15 on the platen 45 is aligned with track 16 leading to the frame 10. The sill clamp 40 is shown in the engage position, however, for movement of a car onto frame 10, the sill clamp 40 would, for example, be retracted by pivotal motion. With the sill clamp 40 in the retracted position, a railroad car 70 can enter the frame 10 to be affixed to the track with the clamping means. The receiver box cover 35 may or may not be within the receiver box 30 at the time the railroad car 70 is placed in the frame 10 and affixed to a portion of railroad track. If the receiver box cover 35 is in place, it is then removed and the receiver box 30 is lowered over the railroad car as depicted in FIG. 6.

Figure 7:
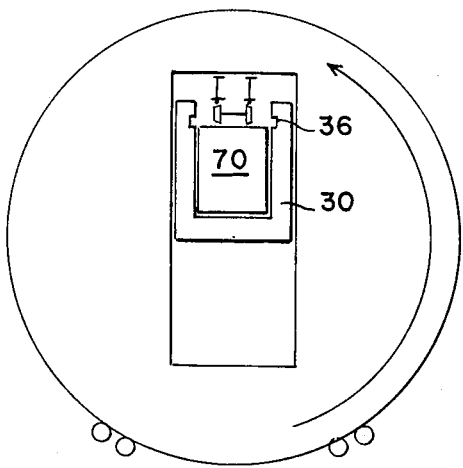

As previously disclosed, the receiver box 30 is lowered by the action of the driven chains 20. The railroad car 70, after being affixed to the track 15 and covered with the receiver box 30, is then inverted as depicted in FIG. 7 by rotating the frame 10 and thus car 70 and the receiver box 30, 180° about their longitudinal axes. In the embodiment depicted in FIG. 4, the rotation of the car 70 and the receiver box 30 is accomplished by the drive means 25 engaged with the rotating frame 10. In the inverted position depicted in FIG. 7, the bulk cargo within the railroad car falls, through the action of gravity, to rest on the receiver box bottom 31.

Because the bulk cargo is placed in the receiver box 30 gradually as the receiver box is rotated toward the inverted position depicted in FIG. 7 and since the distance from the bulk cargo to the receiver box bottom 31 is generally a short distance, preferably 4 feet or less, the material transfer does not generate large amounts of dust from bulk cargo nor disorder ordered cargo such as logs unloaded in this manner.

Figure 9:
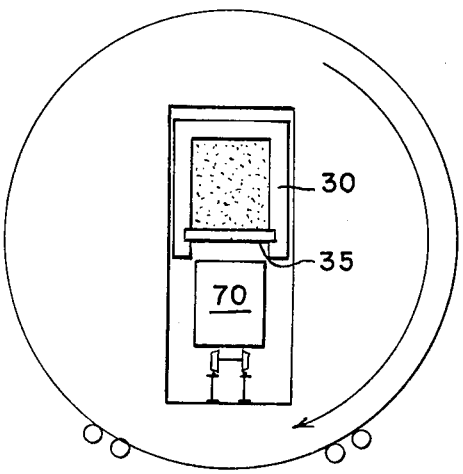

The receiver box 30 containing the bulk cargo is then lowered. In the embodiment depicted in FIG. 4, the driven chains 20 lower the receiver box 30. The receiver box cover 35 is then placed in the slots in receiver box 30 as depicted in FIG. 8. As previously disclosed, it is preferred that the receiver box cover 35 be supported in the same plane as the axis of rotation of the frame 10, and that the slots in the receiver box when in the position depicted in FIGS. 5 and 8 also have their centerlines in this horizontal plane. When this preferred configuration is present, the operation of inserting and extracting the receiver box cover 35 can be accomplished when the receiver box 30 is in the upright position depicted in FIGS. 5 and 9 or the inverted position depicted in FIG. 8. The frame 10 and, therefore, the railroad car 70 and the receiver box 30 are then rotated 180° as depicted in FIG. 9. The bulk cargo within the receiver box 30, now supported by the receiver box cover 35, is then discharged from the receiver box 30.

The discharge of the bulk cargo from the receiver box can be carried out while the railroad car is being removed from the frame 10.

As previously disclosed, it is preferred to discharge the cargo from the receiver box 30 by removing one end therefrom and by pushing the cargo out the open end of the receiver box 30. As depicted in the embodiment of FIG. 4, the powered piston 50 is one means of pushing the cargo from the receiver box. The piston 50 traverses the receiver box from end to end pushing the cargo therein out the end of the receiver box 30 normally closed by removable endwall 34.

While the invention has been disclosed in terms of specific and illustrative embodiments, the scope of the invention is not limited to the embodiments specifically disclosed. One skilled in the art may make modifications or additions to the invention as disclosed herein without departing from the scope of the invention as defined by the appended claims.

What is claimed is:

1. A railroad car unloading apparatus comprising:
   a. a rotatably mounted frame having railroad track mounted thereon for supporting a railroad car containing bulk cargo;
   b. a drive means for rotating said frame from a car supporting position at least about 180° about the longitudinal axis of said frame to a discharge position to thereby discharge by gravity bulk cargo from a railroad car on the track;
   c. clamping means mounted on said frame for holding said railroad car on said track during rotation of said frame and said railroad car;
   d. a receiver box for receiving bulk cargo from the railroad car, said receiver box having interior dimensions greater than the exterior dimension of a railroad car to be unloaded, said receiver box being movably mounted on said frame;
   e. a receiver box cover for covering the top of said receiver box when said frame is being rotated from its discharge position to its car supporting position; and
   f. positioning means for cyclicly moving said receiver box
      i. to permit entry of a railroad car onto said frame,
      ii. to enclose the top and sides of the railroad car with the receiver box, and
      iii. to move said receiver box away from said railroad car to permit placement of said receiver box cover on said receiver box before rotation of said frame back to its car-supporting position.

2. The apparatus of claim 1 where said frame includes a plurality of circular circumferential rails that support said frame on trunnion bearings to allow said frame to rotate about its longitudinal axis.

3. The apparatus of claim 2 in which the said track is aligned with track leading to said apparatus when said frame is in the car receiving position.

4. The apparatus of claim 1 in which said clamping means engages the sills of said railroad car.

5. The apparatus of claim 4 where said clamping means engage the couplings on said railroad car.

6. The apparatus of claim 1 in which said positioning means comprises driven chains that raise and lower said receiver box.

7. The apparatus of claim 1 in which said receiver box includes a bottom, a load bearing sidewall capable of supporting the rail car and its cargo during rotation of said frame, a second sidewall, and a removable endwall; and including discharge means for discharging the cargo from said receiver box when said removable endwall is removed.

8. The apparatus of claim 1 including a cover support structure positioned adjacent said frame, and cover positioning means for moving said cover into and out of engagement with said receiver box.

9. The apparatus of claim 8 in which the interior sidewalls of said receiver box each include a longitudinally-extending slot for receiving said cover.

10. The apparatus of claim 7 in which said discharge means comprises a piston mounted on said receiver box opposite said removable endwall, for movement along the longitudinal axis of said receiver box to discharge the cargo out the end of said receiver box from which said removable endwall has been removed.

11. The apparatus of claim 10 including conveying means positioned to receive cargo discharged from the end of said receiver box.

12. A method of unloading a railroad car containing bulk cargo comprising the steps of:
   a. affixing said car on a portion of railroad track, said track affixed to a rotatable frame;
   b. lowering a receiver box also affixed to said rotatable frame over said railroad car;
   c. rotating said rotatable frame, said car and said receiver box 180° about their longitudinal axis to discharge the bulk cargo into the receiver box;
   d. lowering said receiver box containing said cargo;
   e. placing a receiver box cover on said receiver box;
   f. rotating said frame, said receiver box and said railroad car 180°;and
   g. discharging said cargo from said receiver box.

13. The method of claim 12 including the step of removing said car from beneath said receiver box while cargo is discharging from said receiver box.

14. The method of claim 12 in which discharging said cargo includes the steps of removing one end of the receiver box, and pushing the cargo out said one end.

* * * * *